Nov. 8, 1955
W. B. LEON
2,722,781
CUTLERY SHARPENER
Filed Nov. 17, 1952
3 Sheets-Sheet 1
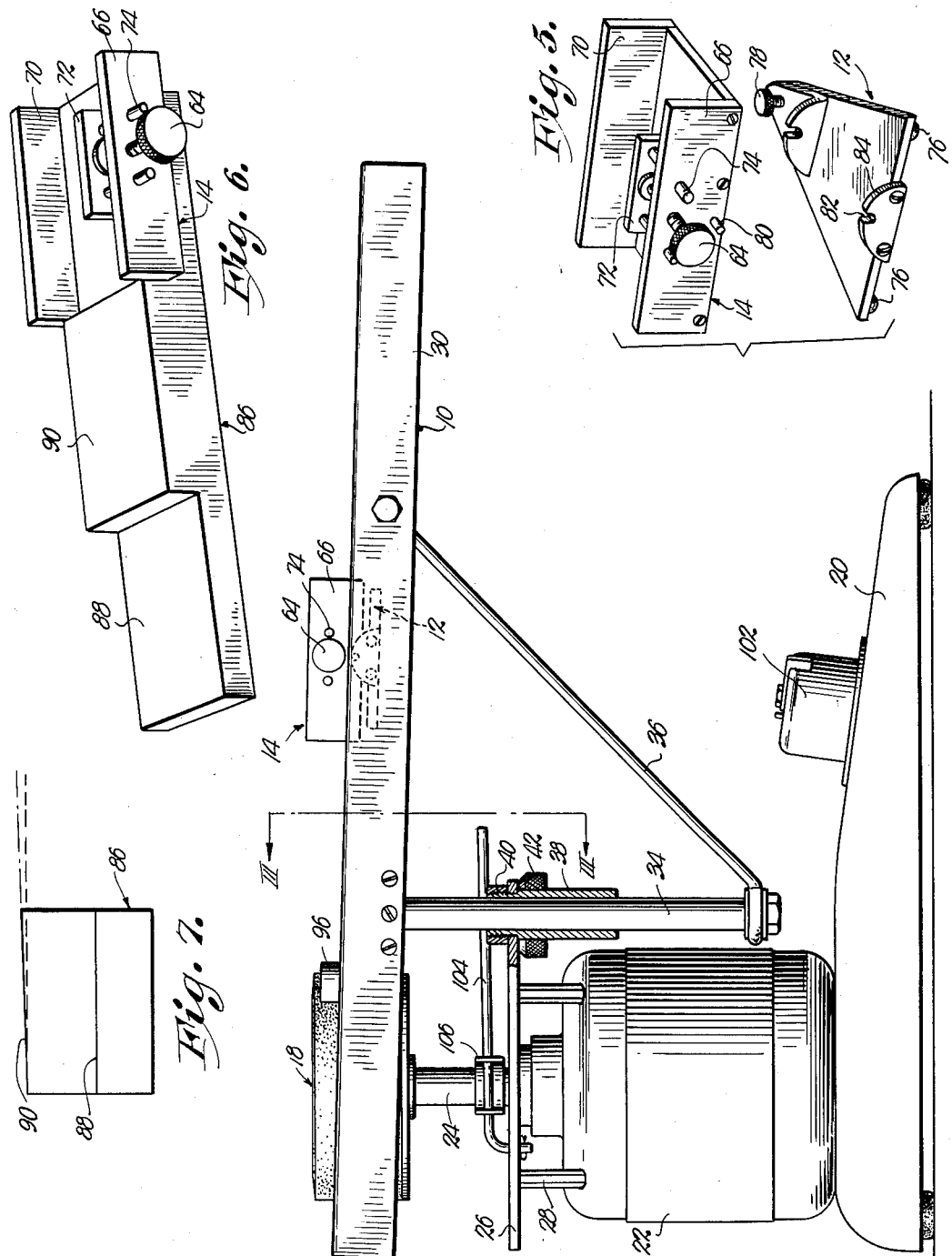
INVENTOR.
William B. Leon
BY
ATTORNEY.

Nov. 8, 1955 W. B. LEON 2,722,781
CUTLERY SHARPENER
Filed Nov. 17, 1952 3 Sheets-Sheet 2
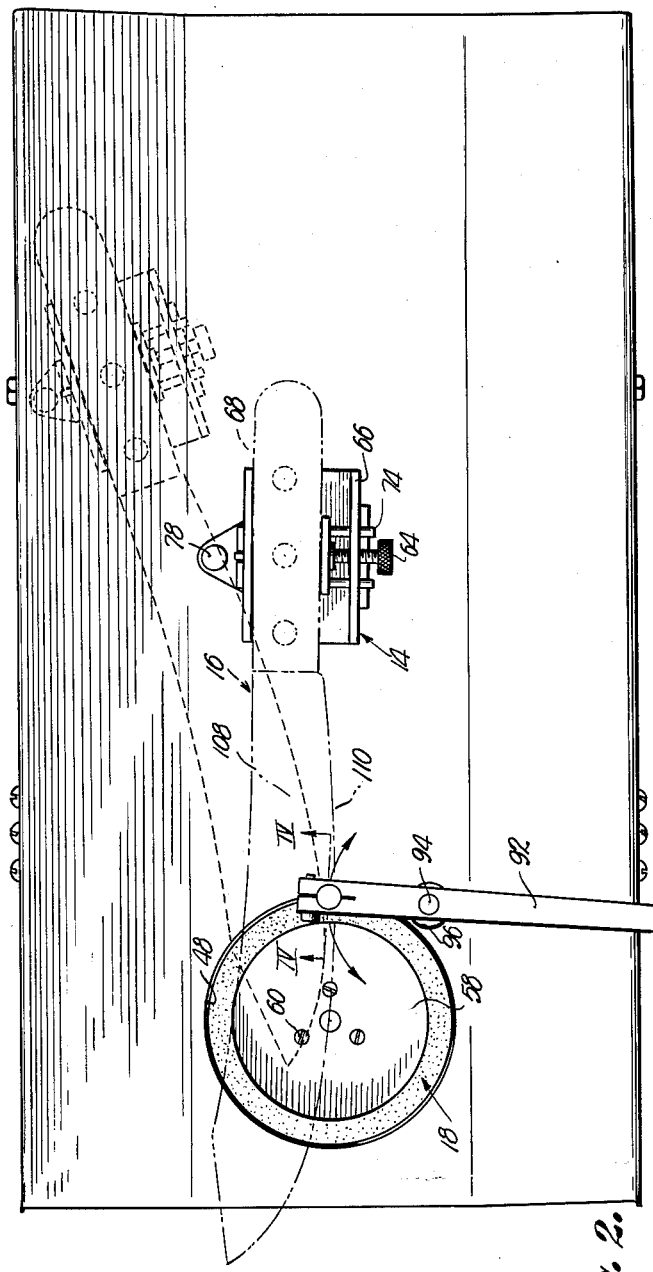
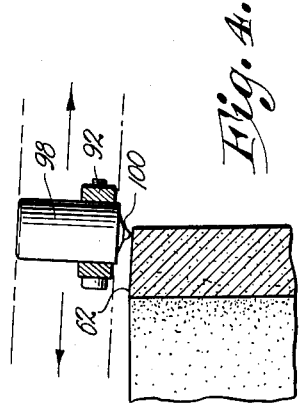
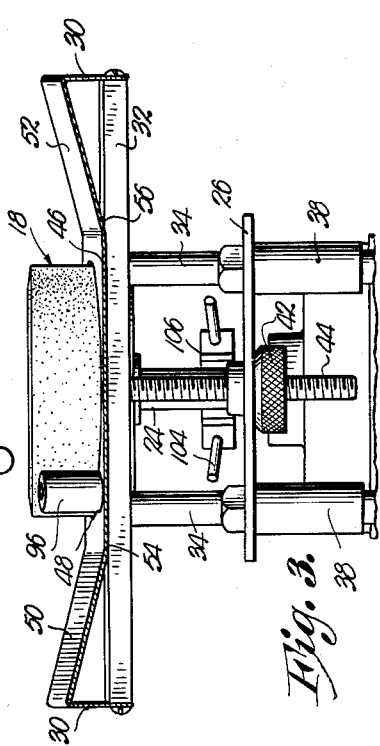
INVENTOR.
William B. Leon
BY
ATTORNEY.

Nov. 8, 1955 W. B. LEON 2,722,781
CUTLERY SHARPENER
Filed Nov. 17, 1952 3 Sheets-Sheet 3
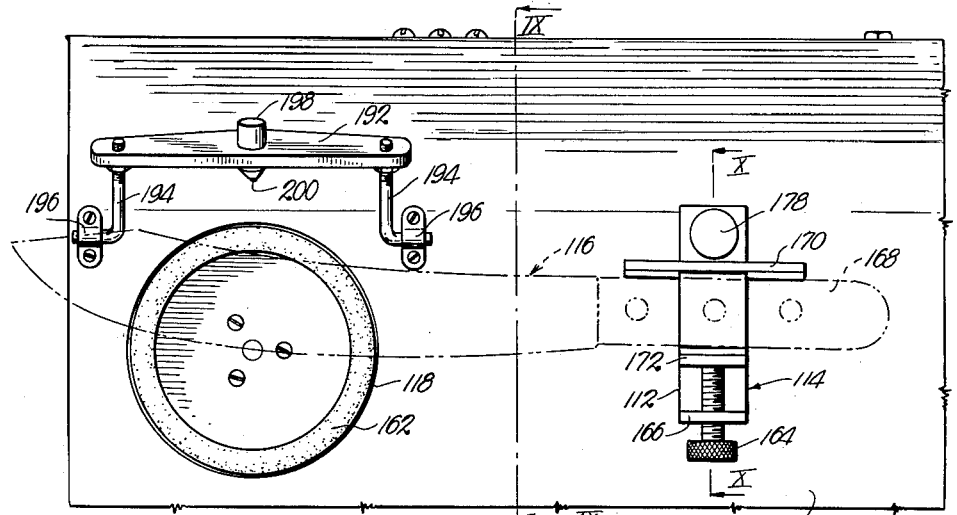
Fig. 8.
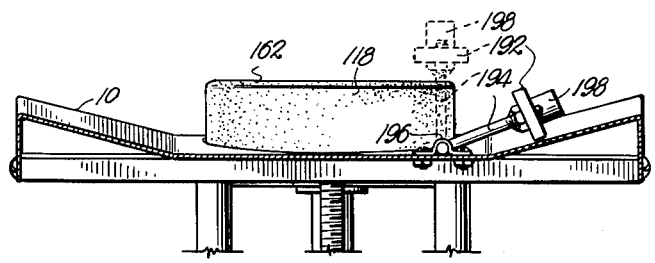
Fig. 9.
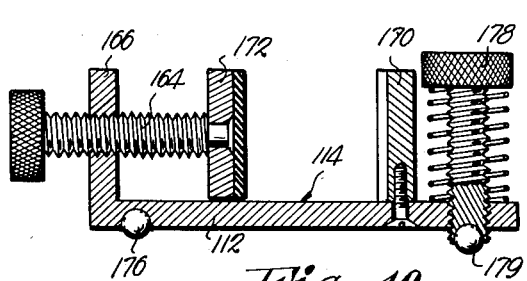
Fig. 10.
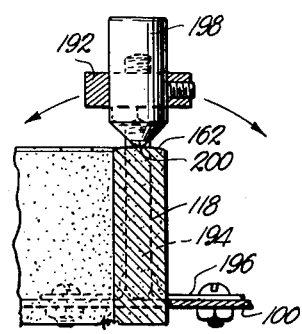
Fig. 11.
INVENTOR.
William B. Leon
BY
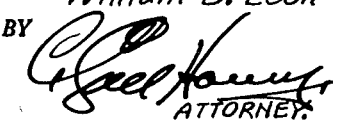
ATTORNEY.

United States Patent Office 2,722,781
Patented Nov. 8, 1955

2,722,781

CUTLERY SHARPENER

William B. Leon, Tulsa, Okla.

Application November 17, 1952, Serial No. 320,892

1 Claim. (Cl. 51—93)

This invention relates to the field of grinding and polishing, and more particularly to a sharpener for cutting implements such as knives, the primary object being to provide means to aid the operator in obtaining the correct bevel throughout the length of the blade and to also assure a hollow grinding as desired in most types of cutting devices.

It is the most important object of the present invention to provide a knife sharpener employing a rotatable, cylindrical stone having an annular, band-like, uppermost edge against which the knife blade is brought to bear during the sharpening operation, said edge having a predetermined, transverse configuration to attain the desired hollow grinding not made possible by conventional sharpening devices.

Another important object of the present invention is to provide a sharpener for knives having a novel table associated with the grinding stone upon which a holder for the knife is slidably disposed, the table being inclined and having upwardly and outwardly extending marginal portions for permitting the operator to vary the extent of bevel in the blade throughout the length of the cutting edge thereof.

A further object of this invention is to provide a clamp for holding the knife in a proper position with respect to the stone, the clamp being adjustable with respect to the table upon which it slides to vary the angle of bevel in the knife blade as desired by the user.

Other objects include the way in which one form of clamp is rendered quickly removable from a base therefor; the way in which means is provided in one form of the invention to facilitate mounting the knife in the clamp, thereby assuring the correct height of the blade above the table at all times; the way in which said last-mentioned means tilts the knife blade in the holder to properly form the opposed, marginal edges of the knife blade; the manner of providing means for dressing the stone periodically; and the way in which the table is rendered shiftable with respect to the stone as the latter is dressed away.

Other objects include details of construction, all of which will be made clear as the following specification progresses, reference being had to the accompanying drawings, wherein:

Figure 1 is a side elevational view of a sharpener for knives and the like made pursuant to one form of my present invention, parts being broken away and in section for clearness.

Fig. 2 is a top plan view thereof showing stone trimming means operably mounted thereon and illustrating a knife operably associated with the stone.

Fig. 3 is a fragmentary, transverse, cross-sectional view taken on line III—III of Fig. 1.

Fig. 4 is an enlarged, fragmentary, detailed, cross-sectional view taken on line IV—IV of Fig. 2.

Fig. 5 is a stretched-out, perspective view of the knife holder and its base.

Fig. 6 is a perspective view of the knife holder or clamp mounted on a knife positioning means.

Fig. 7 is an end elevational view of said knife positioning means.

Fig. 8 is a top plan view of a sharpener for knives and the like made pursuant to a modified form of my present invention showing a preferred stone trimming means operably mounted thereon and illustrating a knife operably associated with the stone.

Fig. 9 is a cross-sectional view similar to Fig. 3 taken on line IX—IX of Fig. 8.

Fig. 10 is an enlarged, cross-sectional view of the knife holder of Fig. 8, taken on line X—X of Fig. 8, the knife being removed; and Fig. 11 is an enlarged, fragmentary, cross-sectional view of the stone and the dressing means of Figs. 8 and 9 showing the latter above the stone.

Those skilled in the field of sharpening knives and the like are well aware of the fact that a keen cutting edge that will be long-lasting can be obtained only when a predetermined bevel is produced and when the knife is truly hollow-ground. It is also appreciated that proper sharpening of a knife requires a progressive change in the bevel as the outermost pointed end thereof is approached.

These and other objects are attainable through use of the sharpener about to be described and in the form of my invention shown in Figs. 1 to 7 inclusive, the numeral 10 designates broadly a table upon which a base 12 for a knife clamp 14 is slidably disposed when a knife or other cutting implement 16 is brought into engagement with a cutting stone 18.

The entire assembly is mounted on a suitable base 20 and a reversible electric motor or other prime mover 22, having a vertical drive shaft 24 is rigidly secured to the base 20. A plate 26 overlying the motor 22 and having an opening not shown, for clearing the shaft 24, is rigidly secured to a plurality of posts 28 forming a part of the motor 22.

The elongated table 10 has a pair of longitudinal, down-turned flanges 30 interconnected by a transverse bar 32 underlying the table 10, bar 32 being in turn rigidly secured to the uppermost ends of a pair of vertically reciprocable rods 34. Rods 34 are in turn connected at the lowermost ends thereof with each flange 30 respectively by a brace 36. Each rod 34 is telescoped within a short sleeve 38 secured to the plate 26 by means of a nut 40. Plate 26 also carries a rotatable nut 42 on a screw 44 that depends from the cross-bar 32 between the rods 34.

It is thus seen that the table 10 may be raised and lowered with respect to the plate 26 by manipulation of nut 42. As clearly illustrated in Fig. 1 of the drawings, the table 10 slopes longitudinally downwardly and outwardly away from the cutting stone 18 to the end that said longitudinal axis of the table 10 is not perpendicular to the vertical axis of rotation of shaft 24.

Table 10 is provided with an elongated, central flat portion 46 having an opening 48 near one end thereof for clearing the cutting stone 18. Table 10 also has a pair of longitudinal, marginal portions 50 and 52 that are inclined upwardly and outwardly away from the central portion 46 and co-extensive in length with the portion 46 of table 10. It is to be preferred that the inclined portions 50 and 52 be joined with the central portion 46 by arcuate lines of bend 54 and 56. Stone 18 is cylindrical and removably mounted upon the shaft 24 at the uppermost end of the latter by means of a circular plate 58 secured to the stone 18 at the bottom thereof. A plurality of screws 60 mount the plate 58 on the shaft 24.

The cylindrical configuration of the stone 18 presents an annular, band-like, uppermost edge 62 that is inclined downwardly as the outermost circular periphery of the stone 18 is approached as is best illustrated in Fig. 4 of the drawings. The angle of inclination of edge 62 and of table 10 relative to the axis of rotation 24, is the same and therefore, edge 62 and the longitudinal axis of table 10 are parallel.

The holder 14 is U-shaped as is clear in Figs. 2, 5 and 6 of the drawings, there being a screw 64 mounted in one side wall 66 thereof for clamping handle 68 of knife 16 in place against the innermost face of the opposite wall 70 of clamp 14. A small plate 72 between the walls 66 and 70 bears against the handle 68 and is slidably carried by the wall 66 through the medium of a plurality of pins 74.

The triangular base 12 for the clamp 14 is provided with a plurality of feet 76 and 78 that slidably rest upon the upper surface of table 10, the foot 78 being in the nature of an adjustable screw. Clamp 14 is releasably and swingably mounted on the base 12 through the medium of a pair of opposed pintles 80 carried by the walls 66 and 70, cradled within notches 82 of upstanding ears 84 on the base 12.

Means for positioning the knife 16 within the clamp 14 takes the form of an elongated block 86 having a pair of plateaus at the ends thereof, one only of which is shown in Figs. 6 and 7 of the drawings and designated by the numeral 88, and a central plateau 90. The two end plateaus 88 are parallel with the lowermost face of the block 86 and the plateau 90 is transversely inclined with respect to the lower surface of block 86 as shown in Fig. 7.

Means for dressing the uppermost edge 62 of stone 18 takes the form of an elongated bar 92 having a downturned pin 94 intermediate the ends thereof that extends into an upstanding short tube 96 for free swinging movement when the dressing means is placed in use. The tube 96 has its longitudinal, upstanding axis perpendicular to the table portion 46 and is, therefore, inclined with respect to the axis of rotation of shaft 24. The bar 92 is provided with a plug 98 at one end thereof, having a diamond point 100 capable of trimming away the edge 62 when the bar 92 is swung in the manner indicated by the arrows in Figs. 2 and 4.

A reversing switch 102 for controlling the motor 22 is mounted on the base 20 and a brake for stopping the rotation of shaft 24 after deenergizing motor 22, is mounted on the plate 26. Such brake takes the form of a pair of L-shaped rods 104 swingably secured to the plate 26 and each provided with a shoe 106 that frictionally engages the shaft 24 when the rods 104 are manually moved toward each other.

In operation, blade 108 of knife 16, is brought into engagement with the edge 62 of stone 18 adjacent the cutting edge 110 of blade 108 in the manner illustrated by Fig. 2 of the drawings. It is to be preferred that knife blade 108 contact edge 62 in alignment with the axis of rotation of stone 18 within a vertical plane through the longitudinal axis of table portion 46. When the knife 16 is properly positioned in the clamp 14, blade 108 will engage the edge 62 on one side only of the stone 18 and will not engage the edge 62 at two points even when the knife blade 108 is extended entirely across the stone 18 as shown in Fig. 2.

The knife 16 is positioned properly with respect to the clamp 14 with the aid of block 86 in the manner shown in Fig. 6 of the drawings. Clamp 14 is removed from its base 12 and positioned as shown in Fig. 6 on one of the plateaus 88, depending upon which face of the blade 108 is to be ground. The handle 68 of knife 16 is placed in the clamp 14 between plate 72 and wall 70 with the blade 108 resting flatly upon the plateau 90. Screw 64 is thereupon manipulated to clamp the handle 68 tightly between plate 72 and wall 70. Such positioning of the knife 16 within the clamp 14 predetermines the height of the blade 108 with respect to the top of table 10 when the clamp 14 is placed on its base 12. It also determines the angle of inclination of the blade 108 transversely thereof by virtue of the inclination of pateau 90 with respect to the lowermost surface of block 86.

When the opposite face of the blade 108 is to be ground, the clamp 14 is placed upon the other plateau 88 and the blade 108 is positioned on the plateau 90 prior to manipulation of screw 64 in the same manner. Through use of the block 86 therefore, the bevel in the blade 108 toward the cutting edge 110 will be the same on both faces of the blade 108. In the event however, that the operator desires that the beveling be of a different inclination from that automatically provided by the sloping nature of plateau 90, it is but necessary to manipulate the screw 78 to raise or lower one end of the base 12 relative to the top of table 10.

The extent of hollow grinding depends upon the inclination of the annular cutting edge 62 of stone 18. By way of explanation, if the edge 62 were perpendicular transversely to the axis of rotation of shaft 24 or perpendicular to the innermost and outermost faces of stone 18, and the blade 108 were placed thereon, there would be no hollow grinding, notwithstanding the extent of tipping of blade 108 in the clamp 14. Conversely, if the blade 108 were ground on the outermost cylindrical surface of the stone 18, the extent of hollow grinding would be coincident with the outside diameter of stone 18. Accordingly, as the angle of inclination of edge 62 increases, the extent of hollow grinding will increase proportionately.

While it is well within the skill of the ordinary mechanic to provide means for varying the inclination of the longitudinal axis of table 10 with respect to the axis of rotation of shaft 24 which will also vary the angle of inclination of tube 96 rigidly mounted to the portion 46 of table 10, it is to be preferred that the extent of hollow grinding remain uniform substantially as shown in Fig. 4 of the drawings, which angle is produced through use of the stone trimming means 92—100.

In sharpening the knife 16 the operator grasps the clamp 14 and shifts the same on the upper surface of table 10, feet 76 and 78 sliding thereon during the grinding operation. Because of the pintles 80 and the notches 82, the operator can easily raise and lower the blade 108 with respect to the cutting edge 62 by merely swinging the clamp 14 with respect to base 12. Inasmuch as the width of the bevel in the blade 108 must progressively diminish as the outermost pointed end of blade 108 is approached, the base 12 will be shifted laterally upon one of the inclined portions 50 or 52 of table 10 as the pointed end of blade 108 is being ground. In this connection, it is understood that table portion 50 is utilized when one face of blade 108 is being ground and when the motor 22 rotates in one direction, and that the other portion 52 is used when the opposite face of blade 108 is ground and when motor 22 operates in the opposite direction.

Another advantage of removably mounting the clamp 14 upon its base 12, lies in the fact that the operator can quickly and easily remove clamp 14 to inspect the grinding operation by merely inverting the knife 16 periodically during the sharpening operation.

Dressing of the uppermost edge 62 of stone 18 from time to time is a simple matter since the pin 94 of bar 92 may be slipped in place within the tube 96 and the diamond point 100 moved back and forth across the edge 62. The user of the sharpener hereof is assured that the angle of inclination of the edge 62 will always be the same after trimming because of the rigid mounting of tube 96 on the table 10. As the stone 18 is gradually and progressively ground away by periodic trimming or dressing, the nut 42 may be manipulated to lower the table 10 and thereby maintain the same spacing between the edge 62 and the upper surface of table 10 at all times.

In Figs. 8 to 11 inclusive, table 10 and its associated parts remain the same. Edge 162 of stone 118 has a slightly different configuration in that it is transversely arcuate instead of flat and outwardly beveled as in the case of edge 62. Such arcuate crown is determined by the radius of a stone dresser including a swingable bar 192 provided with an adjustable plug 198 having a diamond point 200 capable of trimming away the edge 162 when the bar 192 is swung in the manner indicated by the arrows in Fig. 11. A pair of journals 196 secured to table 10 rotatably receive L-shaped pins 194 adjustable in bar 192.

Holder 114 for knife 116 is U-shaped and a screw 164 in one side wall 166 clamps handle 168 of knife 116 in place against the innermost face of the opposite wall 170 of clamp 114. A small plate 172 between walls 166 and 170 bears against the handle 168 and is rotatably carried by screw 164.

Feet for holder 114 take the form of a roller 176 on the bottom wall 112 thereof and an adjustable, spring-loaded screw 178 provided with a roller 179.

The invention as shown in Figs. 8 to 11 inclusive is to be preferred since it eliminates the necessity of base 12 for the knife clamp or holder and makes it unnecessary to provide the block 86 shown in Figs. 6 and 7. Dressing of the stone 118 on a radius instead of flatly, provides for faster cutting with less heat and allows the knife 116 to be sharpened from the angle from which it rests in the holder 114, requiring no height gauge as in Figs. 6 and 7. Holder 114 positions knife 116 by resting handle 68 thereof on the bottom wall 112. The dresser of Figs. 8, 9 and 11 crowns the edge 162 so that the knife blade need not be located accurately for height. The crowned wheel 118 permits the knife blade to rest on the cutting radius of the crown 162 from any angle that the holder 114 provides.

Having thus described the invention what is claimed as new and desired to be secured by Letters Patent is:

In a sharpener for cutting implements, an elongated, substantially rectangular table having a substantially rectangular, flat, central, longitudinal portion and a pair of substantially rectangular, flat, side, longitudinal portions on opposite sides of said central portion, said portions being longitudinally sloped upwardly at an acute angle from horizontal as one end of the table is approached, said central portion being transversely substantially horizontal, said side portions being transversely oppositely sloped upwardly at an acute angle from horizontal as the sides of the table are aproached, said central portion having a circular opening therein adjacent said one end of the table; a cylindrical cutting stone of annular transverse cross-section extending through said opening and mounted for rotation relative to the table, the geometrical and rotational axes of said stone being substantially vertical, said stone having an uppermost, annular, cutting edge disposed a predetermined distance above said central portion and adapted for engagement with an implement to be sharpened, said edge being transversely convexly arcuate; and structure adapted to hold an implement in predetermined relationship to a surface on which said structure is resting and spaced thereabove a predetermined distance, said structure being supported upon the table for free sliding movement over said portions, whereby an implement held by said structure may be brought into engagement with said cutting edge at various angles of incidence by movement of said structure upon said table across and from one to another of said portions.

References Cited in the file of this patent

UNITED STATES PATENTS

| Number | Name | Date |
|---|---|---|
| 159,526 | Otis | Feb. 9, 1875 |
| 926,101 | Connet | June 29, 1909 |
| 1,770,711 | Probert et al. | July 15, 1930 |
| 1,794,975 | Mershon | Mar. 3, 1931 |
| 1,812,313 | Arter et al. | June 30, 1931 |
| 1,948,859 | Jones | Feb. 27, 1934 |
| 2,043,017 | Stubbs | June 2, 1936 |
| 2,077,195 | Adams | Apr. 13, 1937 |
| 2,131,626 | Keith | Sept. 27, 1938 |
| 2,177,922 | Bell | Oct. 31, 1939 |
| 2,303,715 | Alvord et al. | Dec. 1, 1942 |
| 2,370,908 | Llorenz | Mar. 6, 1945 |
| 2,437,495 | Anderson | Mar. 9, 1948 |
| 2,522,942 | Gillen | Sept. 19, 1950 |
| 2,552,485 | Howard | May 8, 1951 |
| 2,570,107 | Gallagher | Oct. 2, 1951 |